United States Patent
Moore et al.

(10) Patent No.: US 7,203,197 B2
(45) Date of Patent: Apr. 10, 2007

(54) METHOD AND APPARATUS FOR INTERFACING UTOPIA BUS WITH SERIAL TDM CHANNEL TRANSPORTING ATM DATA

(75) Inventors: Clarke Edgar Moore, Huntsville, AL (US); Marty Lee Pannell, Huntsville, AL (US); W. Stuart Venters, Huntsville, AL (US); Zachrey Lee Whaley, II, Decatur, AL (US)

(73) Assignee: Adtran, Inc., Huntsville, AL (US)

( * ) Notice: Subject to any disclaimer, the term of this patent is extended or adjusted under 35 U.S.C. 154(b) by 1023 days.

(21) Appl. No.: 10/180,874

(22) Filed: Jun. 26, 2002

(65) Prior Publication Data

US 2004/0001489 A1   Jan. 1, 2004

(51) Int. Cl.
*H04L 12/28* (2006.01)
(52) U.S. Cl. .................... 370/395.1; 370/419
(58) Field of Classification Search ............... None
See application file for complete search history.

(56) References Cited

U.S. PATENT DOCUMENTS

| | | | | |
|---|---|---|---|---|
| 5,633,870 A * | 5/1997 | Gaytan et al. | ............... | 370/235 |
| 5,774,465 A | 6/1998 | Lau et al. | ................... | 370/397 |
| 5,999,529 A * | 12/1999 | Bernstein et al. | ........... | 370/376 |
| 5,999,533 A * | 12/1999 | Peres et al. | ............... | 370/395.4 |
| 6,005,865 A * | 12/1999 | Lewis et al. | ................ | 370/398 |
| 6,081,530 A | 6/2000 | Wiher et al. | ................ | 370/395 |
| 6,147,997 A | 11/2000 | Holden et al. | .............. | 370/395 |
| 6,208,654 B1 * | 3/2001 | Moteki et al. | ............ | 370/395.2 |
| 6,606,300 B1 * | 8/2003 | Blanc et al. | ................ | 370/229 |
| 6,751,224 B1 * | 6/2004 | Parruck et al. | .......... | 370/395.6 |
| 6,826,187 B1 * | 11/2004 | Hey et al. | ................ | 370/395.6 |
| 6,970,966 B2 * | 11/2005 | Gemelli et al. | ............ | 710/305 |
| 2003/0227913 A1 * | 12/2003 | Hallman et al. | ............ | 370/374 |

OTHER PUBLICATIONS

U.S. Appl. No. 09/442,299, entitled: Active Decoupling and Power Management Circuit for Line-Powered Ringing Generator.
U.S. Appl. No. 09/378,382, entitled: Power- Limited Remote Termination Converter with Wetting Current and Emergency Power Operation for Digital Data Services Equipment.

* cited by examiner

*Primary Examiner*—Phirin Sam
(74) *Attorney, Agent, or Firm*—Allen, Dyer, Doppelt, Milbrath & Gilchrist, P.A.

(57) ABSTRACT

A bidirectional serial TDM backplane—UTOPIA interface contains an ATM cell boundary location and transmit flow control mechanism, to provide for the efficient capture and storage of ATM cells from a serial TDM channel. Once stored in a transmit buffer, individual ATM cells are controllably read out for application to a downstream UTOPIA interface. In the upstream direction from the UTOPIA bus toward the serial TDM backplane, ATM cells are stored in a multi-cell receive buffer, so that they may be serialized for application to the TDM backplane. In the absence of ATM data cells to transfer, unfilled timeslots are filled with idle cells to maintain the ATM bus active.

27 Claims, 12 Drawing Sheets

METHOD AND APPARATUS FOR INTERFACING UTOPIA BUS WITH SERIAL TDM CHANNEL TRANSPORTING ATM DATA

FIELD OF THE INVENTION

The present invention relates in general to communication systems and subsystems therefor, and is particularly directed to a method and apparatus for interfacing a serial data communication channel, such as a serial time division multiplexed (TDM) backplane of a telecommunication equipment shelf used for the transport of asynchronous mode transfer (ATM) data, to and from a parallel data channel, such as a UTOPIA (Universal Test and Operations PHY Interface for ATM) bus.

BACKGROUND OF THE INVENTION

Since the introduction of asynchronous transfer mode (ATM) protocol for cell switched communications, the specification for handling the flow of ATM digital cells or packets between devices has been refined to a prescribed set of parameters with which an ATM interface must conform. In particular, the telecommunication industry's ATM Forum has defined the functionality of an ATM layer and a physical (PHY) layer, as well as a Universal Test and Operations PHY Interface for ATM (e.g., UTOPIA or UTOPIA L2) interface therebetween, which manages the flow of ATM cells or packets from the ATM layer to the PHY layer, and from the PHY layer to the ATM layer.

Although ATM cells are assembled to conform with a prescribed standard, once they have been placed onto a serial channel they look like any other serial digital data stream and are not readily directly interfaced as such with a UTOPIA bus. To date there has been no mechanism that readily provides for the interfacing of ATM cells between a serial communication type device, such as a serial time division multiplexed (TDM) backplane of a telecommunication equipment shelf, and a UTOPIA bus, so as to facilitate bi-directional data flow between the serial TDM link and the UTOPIA bus.

SUMMARY OF THE INVENTION

Pursuant to the invention, this objective is successfully addressed by a serial TDM backplane—UTOPIA bus interface. In the transmit or 'downstream' direction, a cell boundary location or ATM cell 'filter' within a TDM-UTOPIA section of the interface monitors an incoming serial data stream from the ATM TDM serial backplane, and identifies prescribed ATM cell boundaries within the serial ATM data stream. Using this cell boundary information, respective ATM cells are successively parsed from the monitored serial data stream, and controllably written into a multi-cell transmit buffer of a transmit cell storage and control unit. Once stored in the transmit buffer, the individual ATM cells are controllably read out for application to a downstream UTOPIA interface.

In order to identify cell boundaries within the serial ATM data stream, the ATM cell filtering routine employs a '1' and '0' bit-counting subroutine that locates the Header Error Correction (HEC) byte segment of a valid ATM header, or determines that the data is an idle cell. If a valid HEC byte is detected for a prescribed number (e.g., eight) of valid ATM cells, synchronization is declared. However, if a predetermined number of HEC errors are detected, loss of synchronization is declared.

The transmit memory is comprised of a prescribed number of storage regions (53X8 bit pages), each of which is capable of storing a single ATM cell. Address codes to these memory slots are binary and increment with every bit received from the serial ATM channel. Once a complete ATM cell has been written into transmit buffer, the validity of the stored cell is determined in accordance with the application of the effects of operations carried out in the cell filtering routine to a cell control flow routine.

In accordance with this routine, once a cell has been declared valid, the mutual relationship between write and read address pointers to a dual port transmit buffer are monitored for purposes of back-pressure flow control. In particular, as sequential write addresses are generated to load individual bits of valid ATM cells into successive bit storage locations of the ATM cell buffers, ATM cell data is stored into successive locations of the dual port transmit memory. A buffer is available for ATM cell storage, so long as it does not contain a valid ATM cell, or if the contents of the buffer have already been transferred to the UTOPIA interface.

If, however, the ATM write address pointers have been advanced to the point that there are no longer any available pages of memory for storing new valid data, currently stored (but not yet read out) ATM cells would be overwritten and therefore lost. Namely, where the flow control indicates that the memory buffers are unable to accept new cells, such flow control information is inserted into time slots of the available TDM bandwidth of the upstream ATM data stream, informing the upstream multiplexers that they should send only idle cells. Although this temporarily slows the data transport rate, it prevents overflow and loss of data.

Once an ATM cell has been stored in one of the pages of the dual port RAM, it is necessary to determine whether the UTOPIA interface will accept that cell. If the UTOPIA interface is available, a complete ATM cell will be read out of memory and transferred to the UTOPIA interface, so that the read-out buffer/page can store a new ATM cell. The UTOPIA interface will continue to transfer or read out ATM cells from memory, as long as valid cells are available, and the external device that is coupled to the UTOPIA interface is ready to accept them.

In the receive or 'upstream' direction from the parallel UTOPIA bus toward the serial TDM backplane, a multi-cell receive buffer of a receive cell storage and control unit within a UTOPIA-TDM section of the interface stores ATM cells as supplied from the UTOPIA bus, so that they may be serialized for application to the TDM backplane. Like the dual port memory in the transmit cell storage and control unit, the receive cell dual port memory contains a prescribed number of storage regions (e.g., 53X8 bit pages, as in the transmit memory), each of which is capable of storing one ATM cell. Each cell does not have to be framed, as it is transferred independently from the UTOPIA interface.

The UTOPIA-TDM section also includes an auxiliary idle cell storage buffer serves as a store for idle cells. These two cell buffers are controlled by the receive cell control unit. In the absence of ATM data cells to transfer, unfilled TDM timeslots are filled with idle cells to keep the ATM bus alive. A UTOPIA (write) and TDM (read) address pointer-based flow control mechanism is used to prevent a cell transfer from the UTOPIA interface if no buffer is available. A buffer is considered unavailable during the time it is being accessed by the ATM interface, or contains a valid cell that has yet to be read out on the serial TDM bus. This prevents over-run and allows more recent data being supplied by the UTOPIA interface to write over older data. The UTOPIA pointer will not advance, so that the page of data to which it currently points will be overwritten until the ATM pointer is incremented. Both the UTOPIA write pointer and the ATM read pointer remain stationary until new data cells are provided.

Flow control information is inserted into two timeslots of the available TDM bandwidth of the upstream ATM data stream. The remaining timeslots are available for the transport of ATM cell data stored in the ATM cell buffers. As the bandwidth available for ATM cell transport is not an even multiple of cell size, a cell may be partially transferred. The ATM interface saves the remaining portion of the cell for transfer during the next available bandwidth data timeslots. Where there are no ATM data cells to transfer, the unfilled timeslots are filled with idle cells.

The output of the transmit cell storage and control unit and the input to the receive cell storage and control unit are interfaced with the UTOPIA bus via a UTOPIA internal loopback path and an IMA loopback path. These loopback paths are individually controllable to accept data from an active upstream or downstream interface and return it through the opposite channel, and thereby provide for testing where an external device is not present at the opposite end of the backplane interface.

BRIEF DESCRIPTION OF THE DRAWINGS

FIG. 1 is a reduced complexity diagram of the general architecture of a serial TDM backplane—UTOPIA interface in accordance with the present invention, while

DETAILED DESCRIPTION

Figure 1:
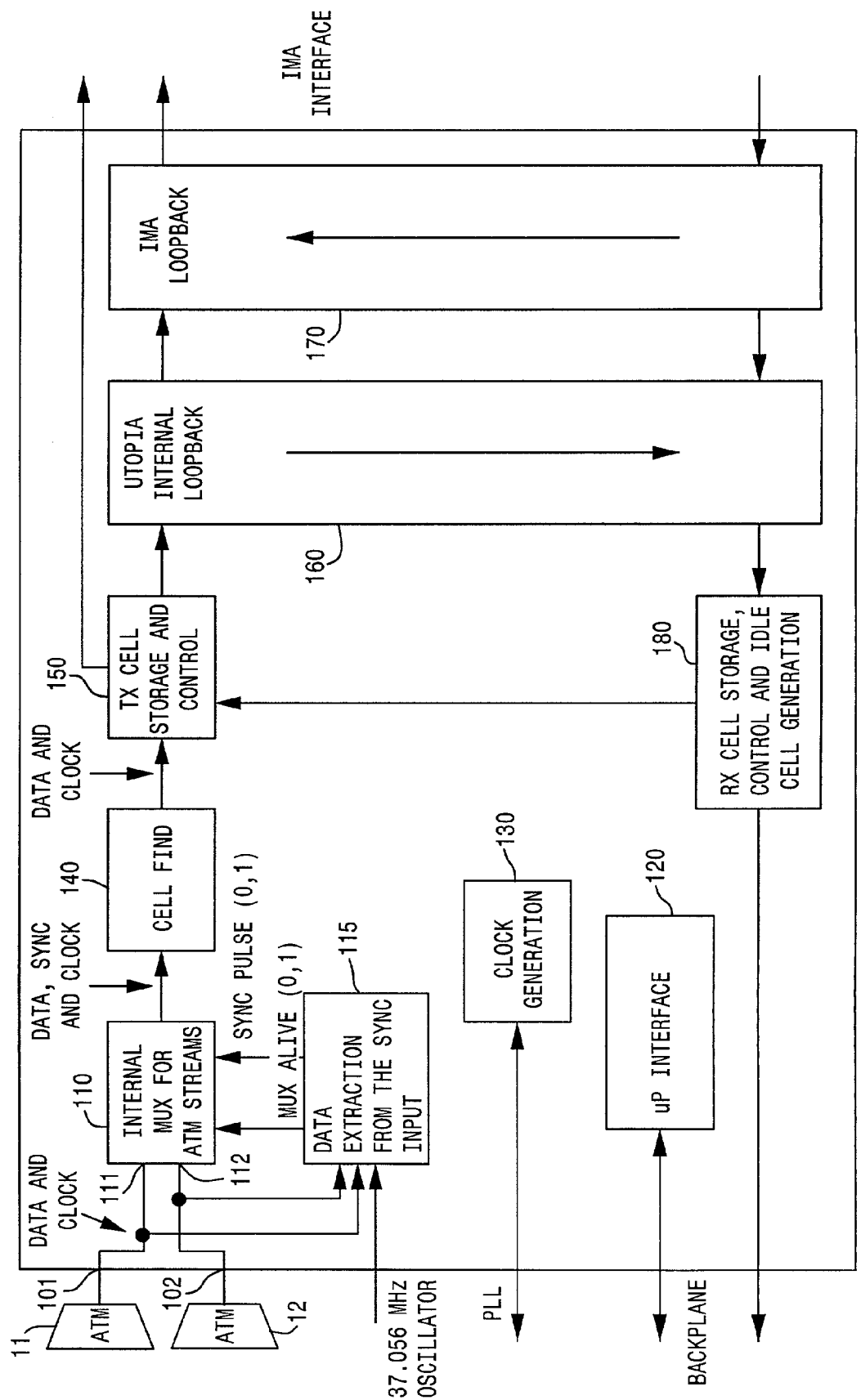

Before detailing the serial TDM—UTOPIA interface of the present invention, it should be observed that the invention resides primarily in a prescribed arrangement of conventional digital communication circuits and components and attendant supervisory communications microprocessor circuitry and application software therefor, that controls the operations of such components. In a practical implementation that facilitates their incorporation into readily commercially available telecommunication transceiver equipment (such as that which may be installed at a central office or customer premises), the inventive arrangement may be readily implemented using a general purpose digital computer, or field programmable gate array (FPGA)-configured, application specific integrated circuit (ASIC) chip sets. In a practical hardware implementation of such chip sets, digital ASICs are preferred.

Consequently, the configuration of such subsystems and components and the manner in which they may be interfaced with both serial and parallel telecommunication channels have, for the most part, been shown in the drawings by readily understandable block diagrams and associated flow charts, which show only those specific details that are pertinent to the present invention, so as not to obscure the disclosure with details which will be readily apparent to those skilled in the art having the benefit of the description herein. Thus, the block diagrams and flow charts of the Figures are primarily intended to show the major components of the invention in convenient functional groupings, whereby the present invention may be more readily understood.

Attention is now directed to FIG. 1, which is a reduced complexity diagram of the general architecture of a serial backplane—UTOPIA interface in accordance with the present invention. In the transmit or 'downstream' direction (from the serial TDM bus toward the IMA UTOPIA interface), the backplane interface is configured to receive an incoming serial ATM data stream from a selected one of plural (transport redundancy) ATM multiplexers (muxes), two of which are shown at 11 and 12. By providing transport redundancy, this multipath selectivity serves to ensure a substantially continuous flow of serial ATM data in the event of a failure in either multiplexer.

Figure 1A:
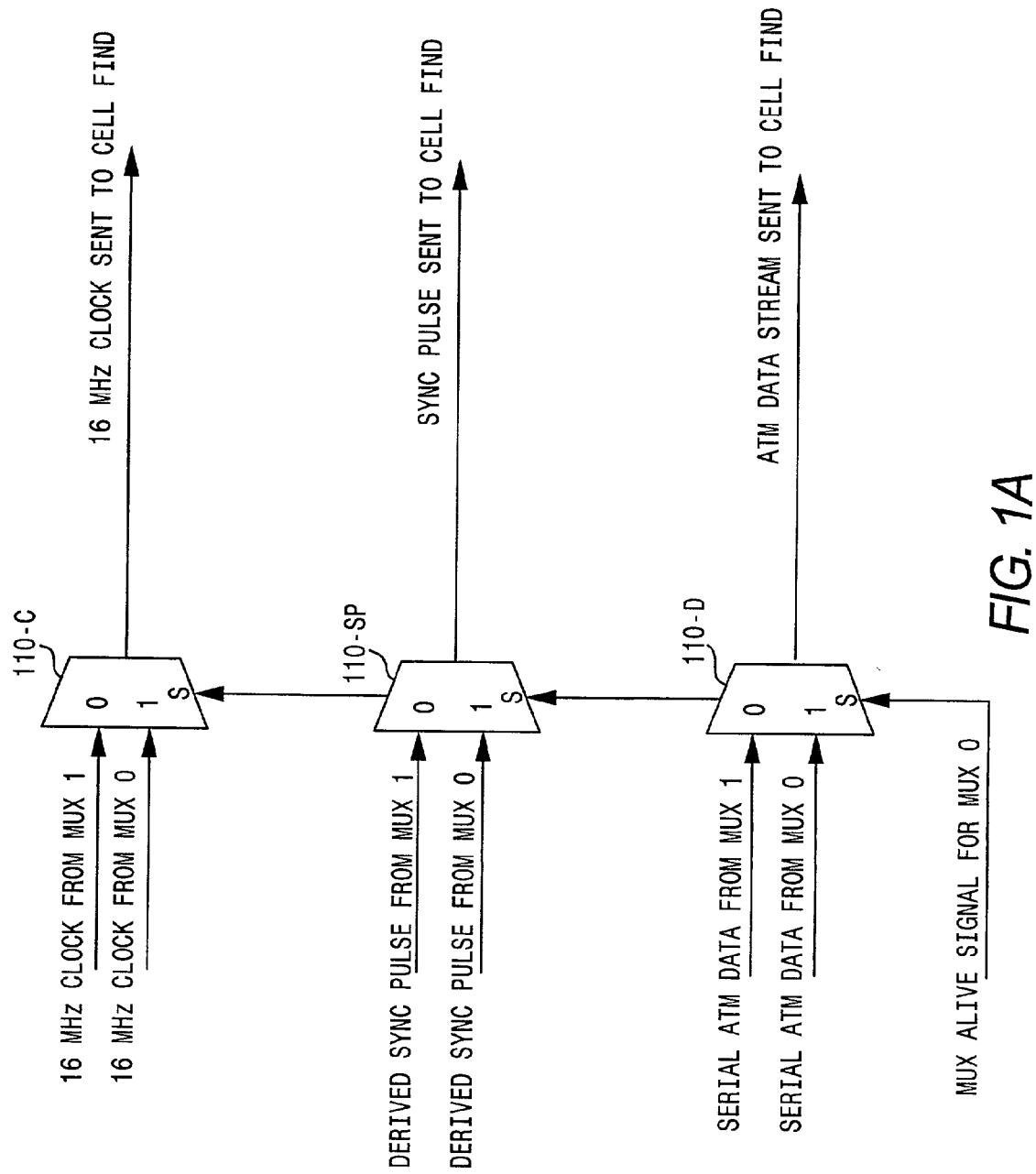
FIG. 1A shows the details of the input mux 110 thereof.

For this purpose, the backplane interface has input ports 101 and 102 that are adapted to be respectively interfaced with serial data channels from the ATM muxes 101 and 102, and coupled to input ports 111 and 112 of an input mux 110 (shown in detail in FIG. 1A, to be described). The steering path through the input mux 110 is normally coupled from a default one of the muxes 11 and 12, and is controllably switched (via the logical state (0/1) of a mux alive signal) to the other mux by a control signal generated by a data extraction unit 115 (shown in detail in FIG. 1B, to be described) from information extracted from the sync pulse inputs from muxes 11 and 12, and a reference clock signal (shown as a 37.056 MHz oscillator signal). A clock is supplied from muxes 11 and 12. Based upon control signals generated by information retrieved from the sync pulses, one of the two clocks will be passed on to a cell boundary location mechanism (cell find) 140.

As shown in FIG. 1A, the internal mux 110 may comprise a set of muxes 110-C, 110-SP and 110-D, each having a pair of inputs coupled to respective input muxes 11 and 12. Mux 110-C is used to switch between a pair of (16 MHz) clock signals; mux 110-SP is used to switch between a pair of sync pulses signals; and mux 110-D is used to switch between a pair of ATM data signals. Each mux has its output coupled to the cell boundary location mechanism (cell find) 140, and the steering path through each of muxes 110-C, 110-SP and 110-D is controlled by the logical state of the alive input from data extraction unit 115, as described above.

Figure 1B:
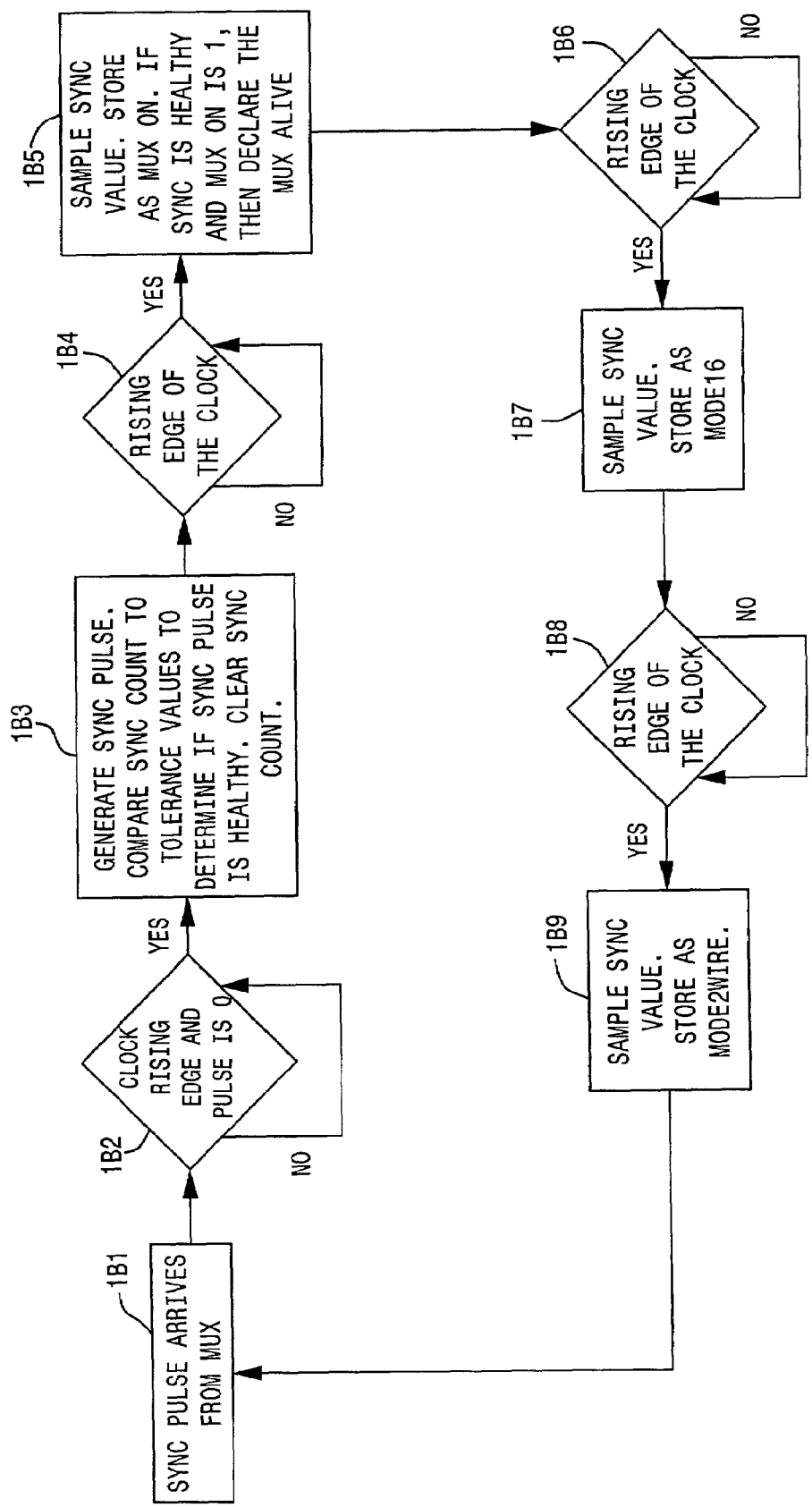
FIG. 1B shows the operation of the data extraction unit 115 thereof.

The sync pulse-based data extraction routine executed by the data extraction unit 115 is shown in detail in FIG. 1B. As sync pulses arrive from the input mux in step 1B1, they are examined in query step 1B2 to locate the clock rising edge and pulse state being 0. Once this has occurred, a sync pulse is generated in step 1B3. Also, a sync count is compared to tolerance values to determine if the sync pulse is within spec. The sync count is then cleared and the routine advances to query step 1B4 to locate the rising edge of the clock.

Once the rising edge of the clock is detected in step 1B4, the routine transitions to step 1B5. In this step the sync pulse is sampled, and stored as a Mux On value. If the sync pulse is within spec. and Mux On has a prescribed logical value (e.g., '1'), the mux is declared as Alive, and the routine transitions to step 1B6. In step 1B6, the rising edge of the clock is located and then in step 1B7, the sync pulse is sampled and stored as Mode16. The routine then transitions to step 1B8, wherein the rising edge of the clock is located and then in step 1B9, the sync pulse is sampled and stored as Mode2Wire. The routine then transitions to step 1B1.

As pointed out above, as the incoming serial data stream containing successive ATM cells is coupled through mux 110, it is monitored by a cell boundary location mechanism (cell find) 140. As will be described in detail below with reference to the flow chart of FIG. 2, the cell boundary location mechanism is operative to identify prescribed ATM cell boundaries within the incoming serial data stream, and thereby enable respective ATM cells within the stream to be parsed from the serial data stream, and controllably written into a multi-cell transmit buffer of a transmit cell storage and control unit 150 (shown in detail in FIG. 4, to be described) Once written into the transmit buffer, the individual ATM cells are controllably read out (via a controlled UTOPIA internal loopback path 160 and an controlled IMA loopback path 170) for application to a downstream UTOPIA interface.

Figure 10:
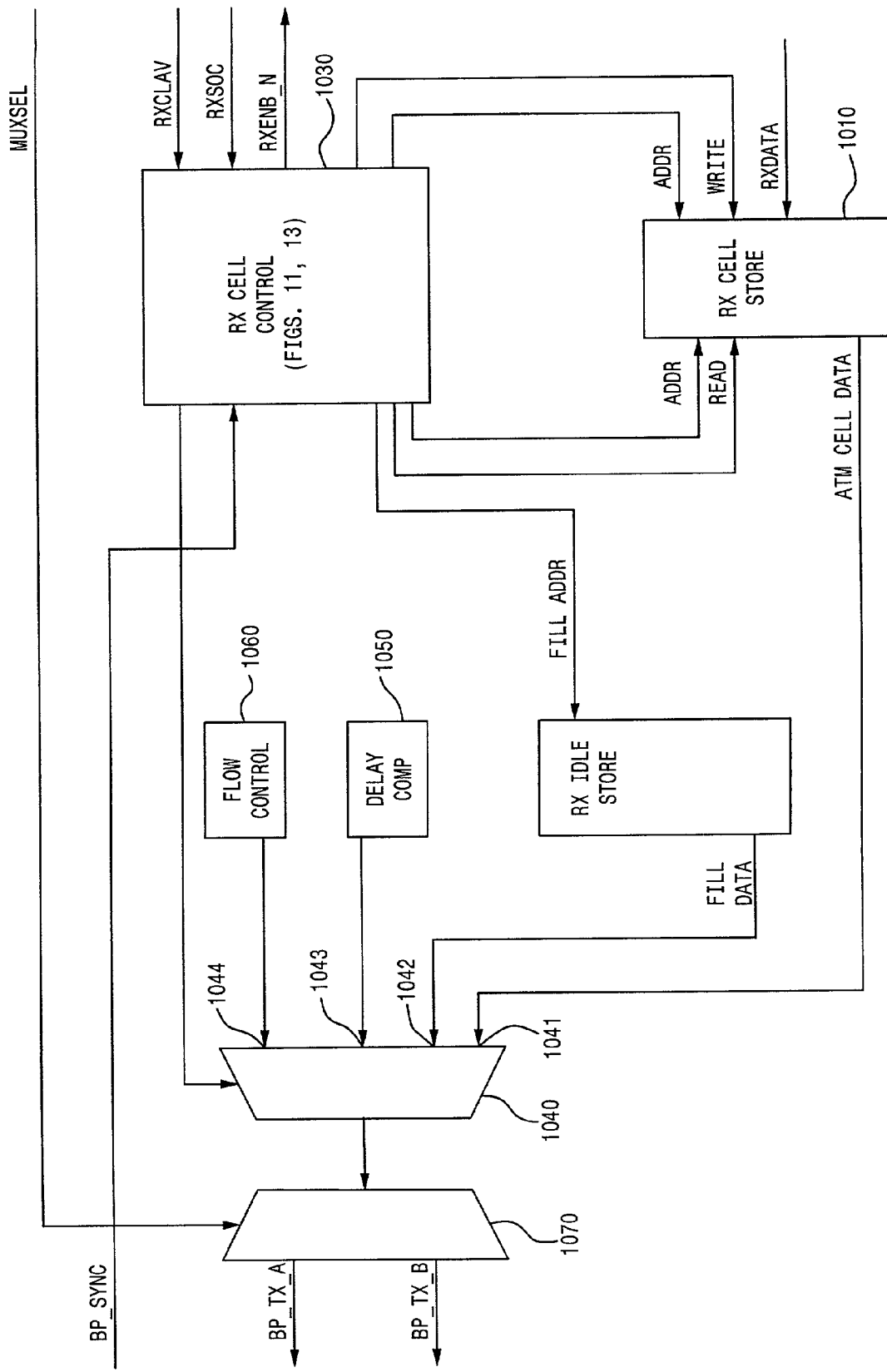
FIG. 10 is an expanded detail diagram of the receive cell storage and control unit of the backplane interface of FIG. 1.

In the receive or 'upstream' direction (from the parallel UTOPIA bus toward the serial TDM backplane), the backplane interface contains a multi-cell receive buffer of a receive cell storage and control unit 180 (shown in detail in FIG. 10, to be described). The receive cell storage and control unit 180 functions in a manner complementary to the transmit cell storage and control unit 150, to controllably store ATM cells as supplied from the UTOPIA bus, and serialize out cells from the buffer for application to the TDM backplane.

Figure 2:
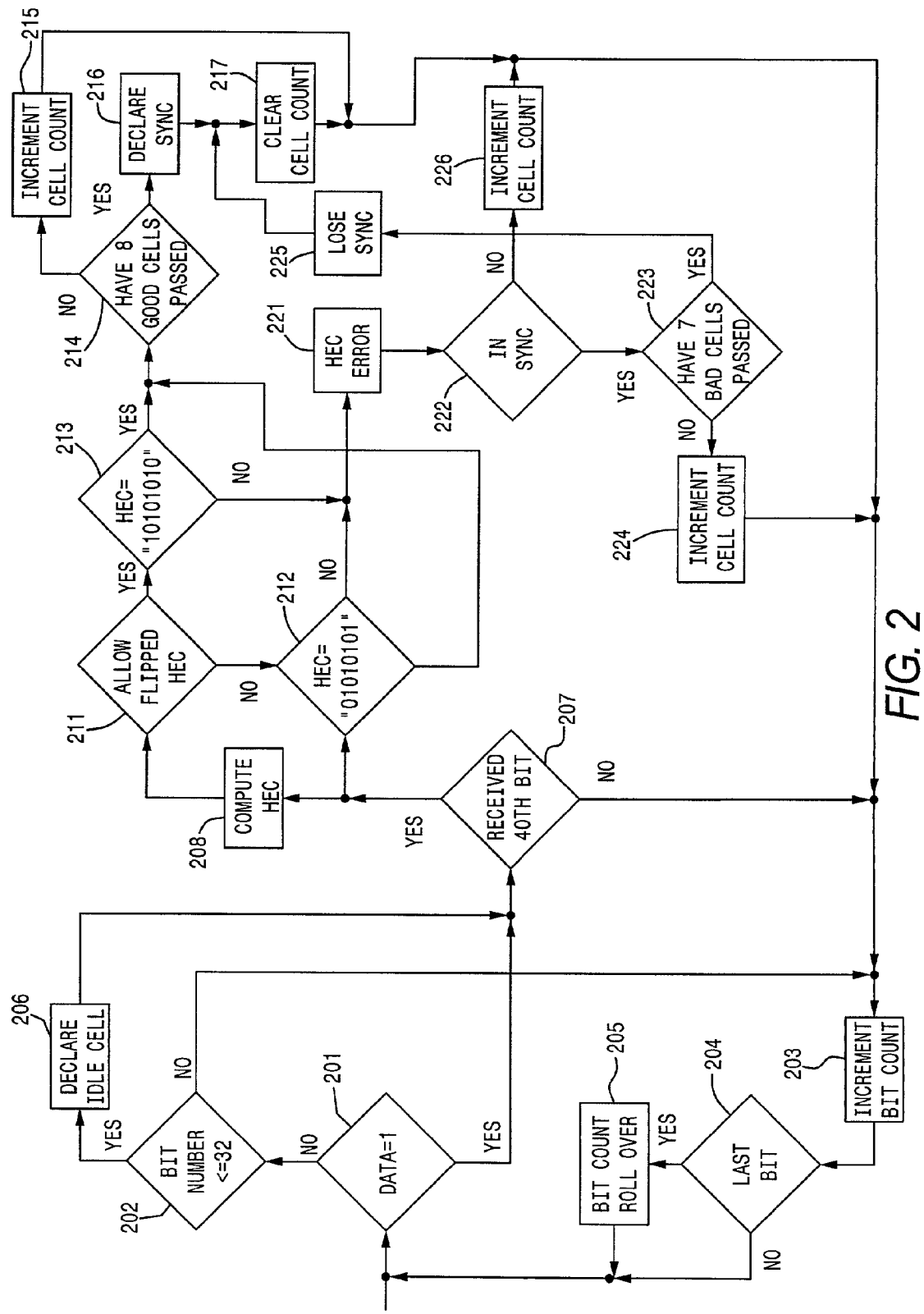
FIG. 2 is a flow chart showing respective steps of the continuously running ATM cell boundary location routine employed in the serial transmit path of the backplane interface of FIG. 1.

Attention is now directed to the flow chart of FIG. 2, which shows respective steps of the continuously running ATM cell boundary location routine employed in the serial transmit path of the backplane interface of FIG. 1. As pointed out briefly above, this routine operates as an ATM cell filter, that is operative to extract valid (non-idle) ATM cells from the continuous serial data stream being fed through the input multiplexer, so that these cells may be controllably written into and read out from the multi-cell transmit buffer of transmit cell storage and control unit 150. The ATM cell boundary location routine of FIG. 2 produces a number of condition-responsive outputs that are employed by the transmit ATM cell control flow routine of FIG. 3, to controllably generate write and read address pointers to a dual port RAM-based transmit buffer memory within the transmit cell storage and control unit 150 of FIG. 1, and shown in expanded detail in FIG. 4, as will be described.

By definition, a standard non-idle ATM cell is fifty-three bytes in length, comprised of a five-byte header followed by forty-eight bytes of payload data. An algorithm is employed to determine if an error has occurred during transmission. This algorithm uses the bits of the five-byte header. After sampling the last byte of the header, an error assessment may be made. The final value of the algorithm will be $0x55_{HEX}$, or alternatively, $0xAA_{HEX}$ if flipped HEC is allowed. When no ATM data is being transported over the serial backplane channel, idle cells are transmitted to keep the channel active and maintain synchronization. The idle cells are identified as cells with zeroes filling the five-byte header.

In order to parse the serial data stream into respective ATM cells, the routine of FIG. 2 initially attempts to locate the beginning of a valid ATM cell. For this purpose, it keeps track of or counts bits and 'good' or 'bad' cells as the bits of successive ATM cells are examined for attributes associated with valid ATM cell boundaries. At the beginning of and whenever the last bit of a complete ATM cell has been detected, a set of soft-counters employed by the routine (to be described) are cleared. As the total number of bits of a valid ATM cell is 424 (or 53 bytes), a cell bit count counter for keeping track of how many bits have been processed (and thereby determine when the last bit of the cell has been encountered) is cleared after counting up to 424 bits. The contents of the cell bit count counter are coupled over a Cell Location bus to the transmit ATM cell control flow routine of FIG. 3, to be described.

Referring now to the flow chart of FIG. 2, as respective bits of the serial ATM data stream are sequentially piped through the input multiplexer, they are examined for the presence of '1' bits associated with a HEC byte segment of a valid ATM header. In particular, in query step 201, a respective bit is examined to determine whether it is a '1' or a '0'. If the received bit is a '1' bit (the answer to query step 201 is YES), the routine transitions to query step 207, to determine whether the fortieth bit has been received. If the received bit is a '0' bit (the answer to query step 201 is NO), the routine transitions to query step 202, to determine whether the number of bits counted (after a cell bit count counter has been reset) is less than or equal to 32. If the answer to query step 202 is NO, the routine increments a bit counter in step 203. It then transitions to query step 204 to determine if the last bit has been received. If the answer to query step 204 is NO, the routine returns to query step 201. If the answer to query step 204 is YES, the routine resets the bit counter in bit count roll over step 205 and then returns to query step 201.

Figure 3:
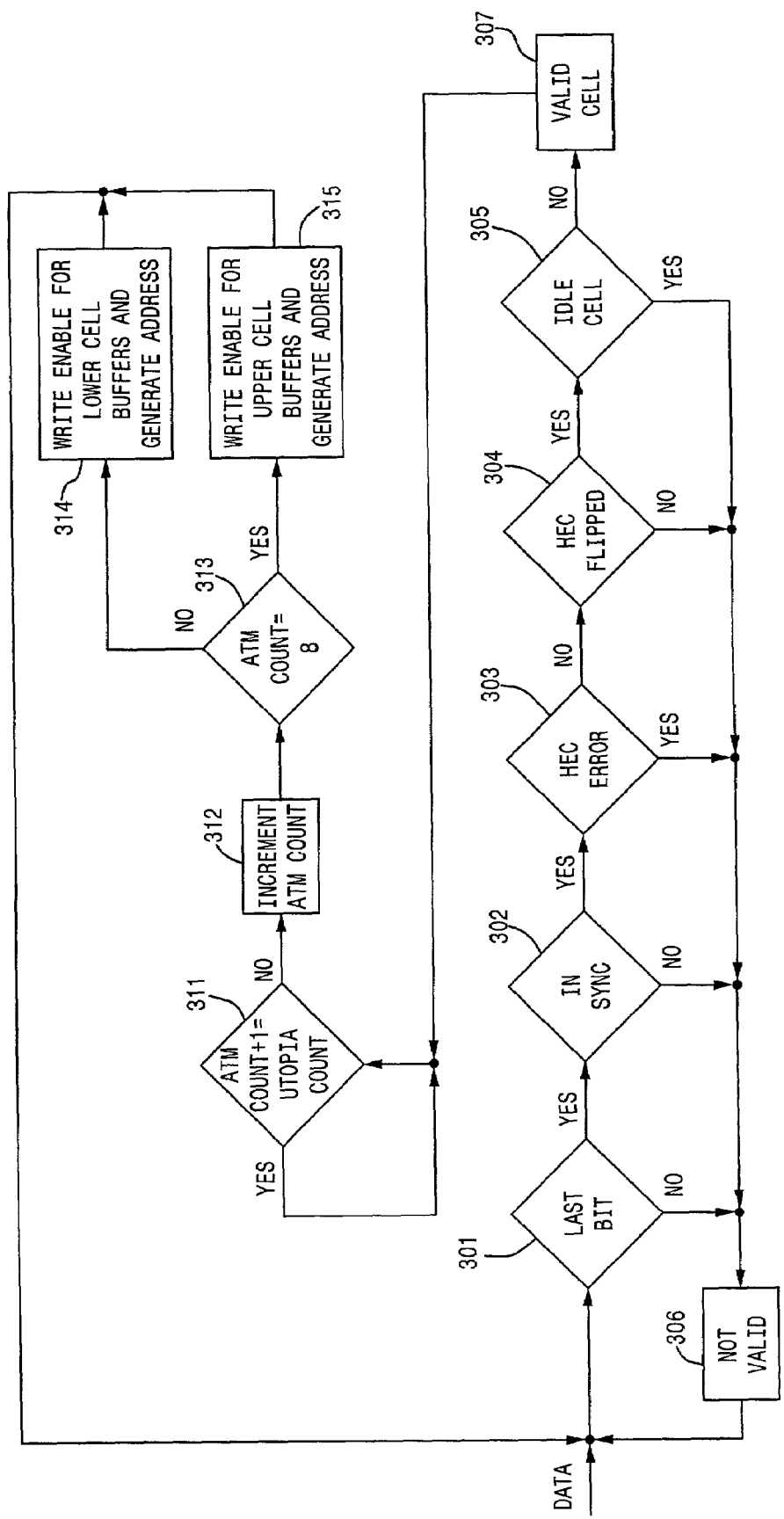
FIG. 3 is a flow chart of a transmit ATM cell control flow routine employed in the serial transmit path of the backplane interface of FIG. 1.

If the answer to query step 202 is YES, the routine transitions to step 206, whereupon an 'idle cell' is declared. In addition, the value of an Idle Cell Bit that is coupled to the transmit ATM cell control flow routine of FIG. 3 is set to a '1'. The routine then transitions to 'received 40th bit' query step 207.

As pointed out above, a standard ATM cell header is five bytes (40 bits) in length. The 'received 40th bit' or 'header count' query step 207 is used to determine whether the number of bits received is sufficient to contain an ATM header. Until 40 bits have been received, the answer to query step 207 will be NO, and the routine will transition to increment bit count step 203, described above.

Figure 2A:
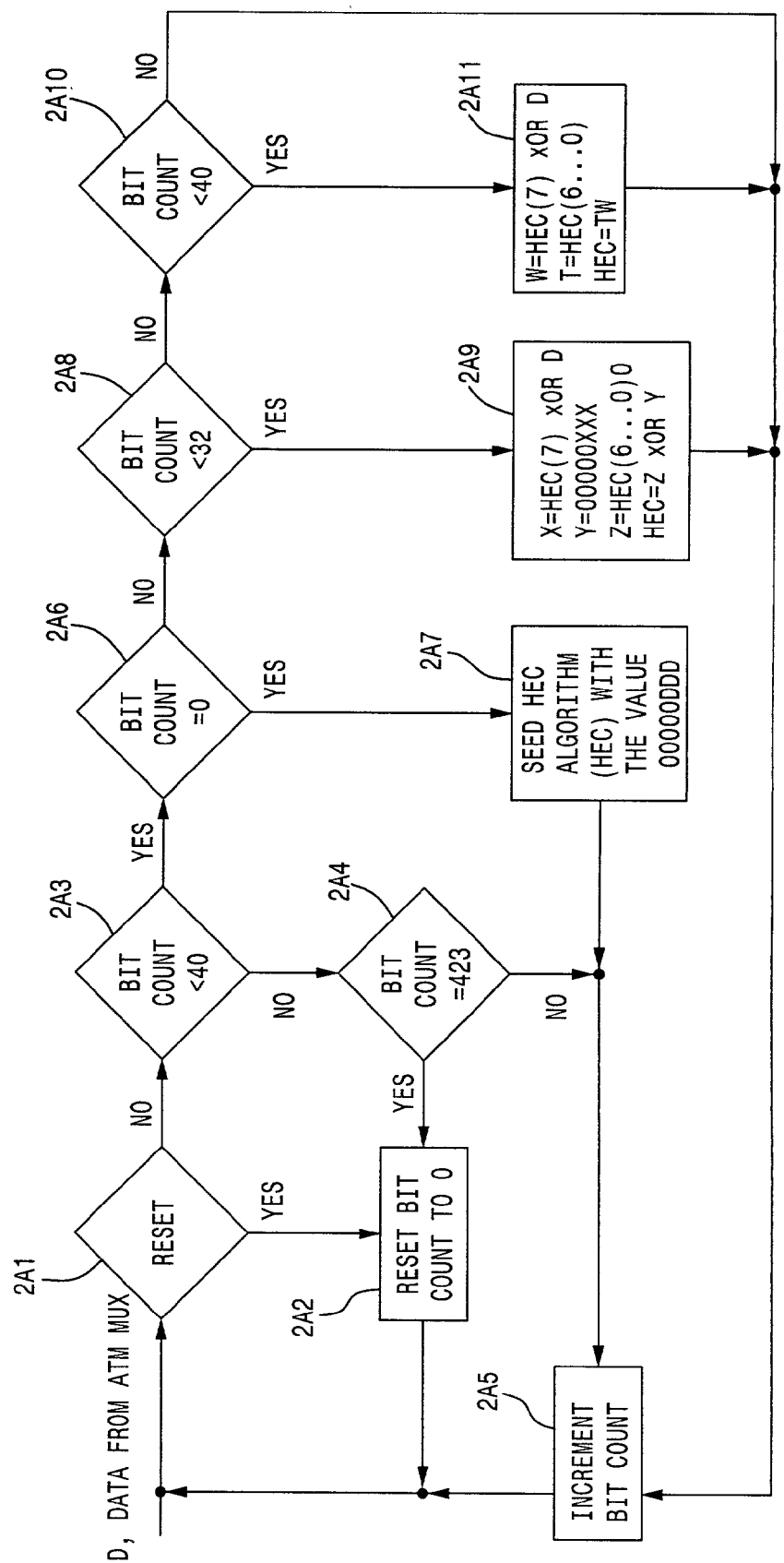
FIG. 2A shows the routine of the HEC calculation step 208 thereof.

Eventually, when the answer to query step 207 is YES, the routine transitions to step 208 wherein a compute HEC routine shown in detail in the flow chart of FIG. 2A is executed. This routine uses the bits of the header to detect the presence of transmission errors. The result of the routine is an eight bit value. The routine has two distinct states. The first 32 bits of the header are handled on one of these states. The eight bits following the first 32 bits are handled in the other state. The function of these subsequent eight bits, when passed through the routine, is to force the product of the algorithm to be $0x55_{HEX}$, or $0xAA_{HEX}$, when flipped HEC is employed. If the product has the correct value when the final bit is sampled, there is no HEC error. Thus, the HEC error is determined by the result of the algorithm. The value referred to as the HEC byte is thus used to force the product to the correct value.

More particularly, with reference to FIG. 2A, as data bits are successively received from the ATM mux they are examined in query step 2A1 to determine whether the bit count is to be reset. If the answer to query step 2A1 is YES, the routine transitions to step 2A2, which resets the bit count to zero and returns to step 2A1. If the answer to query step 2A1 is NO, however, the routine transitions to query step 2A3, to determine whether the bit count is less than forty. If the answer to query step 2A3 is NO, the routine transitions to query step 2A4, which determines whether the bit count has reached 423. If the answer to query step 2A4 is YES, the routine transitions to step 2A2, which resets the bit count to zero and returns to step 2A1. If the answer to query step 2A4 is NO, the routine transitions to step 2A5, which increments the bit counter and then returns to step 2A1.

If the answer to query step 2A3 is YES, the routine transitions to query step 2A6, which determines whether the bit count is zero. If the answer to query step 2A6 is YES, the routine 'seeds' the HEC algorithm in step 2A7 with the eight bit value of $(0000\ 0DDD)_{HEX}$, and then transitions to step 2A5. If the answer to query step 2A6 is NO, the routine transitions to query step 2A8, to determine whether the bit count is less than 32. If the answer to query step 2A8 is YES, the routine transitions to step 2A9. In step 209, a value X is set equal to HEC(7) xor D; a value Y is set equal to 0000 0XXX; a value Z is set equal to HEC(6 . . . 0) 0; where HEC is equal to Z xor Y. The routine then transitions to step 2A5. If the answer to query step 2A8 is NO, the routine transitions to query step 2A10 to determine if the bit count is less than forty. If not, the routine transitions to step 2A5. However, if the bit count is less than forty, the routine transitions to step 2A11. In step 2A11, a value W is set equal to HEC(7) xor D; a value T is set equal to to HEC(6 . . . 0) 0; where HEC is equal to TW. The routine then transitions to step 2A5.

Following the compute HEC step 208, the routine transitions to query step 211. If a normal header $55_{HEX}$ is employed (the answer to step 211 is NO), the routine transitions to step 212 to determine whether the contents of the HEC bit locations in the header are the HEC bit sequence $55_{HEX}$. If a flipped HEC code is allowed, however, the answer to query step is YES, and the routine transitions to query step 213, to determine whether the contents of the HEC bit locations in the header are the 'flipped' HEC bit sequence $AA_{HEX}$.

If the answer to whichever of steps 212 and 213 step 211 has transitioned is NO (a valid HEC code has not been detected), the routine transitions to step 221, and a HEC error is declared. On the other hand, if a valid HEC code has been detected, the answer to whichever of steps 212 and 213 step 211 has transitioned is YES, and the routine transitions to 'in sync?' query step 214.

In query step 214 the routine determines whether a prescribed number (e.g., eight, as a non-limiting example) of valid or 'good' ATM cells have been detected. If the answer to query step 214 is NO, the routine increments a 'good cell' count in step 215 and then transitions to query step 203. However, if the answer to query step 214 is YES, the routine declares synchronization in step 216, clears all soft-counters in step 217, and then transitions to step 203.

When a HEC error is declared in step 221, the routine transitions to 'already in sync?' query step 222, to determine whether an in sync condition has been previously declared. If not (the answer to query step 222 is NO), the routine increments the cell count in step 226 and then transitions to step 203. On the other hand, if an in sync condition has been previously declared (in step 216), the answer to query step 222 is YES, and the routine transitions to a 'bad cell limit' query step 223. In step 223, the routine determines whether a prescribed number (e.g., seven, as a non-limiting example) of invalid or 'bad' ATM cells have been detected. If the answer to query step 223 is NO, the routine increments a 'bad cell' count counter in step 224 and transitions to query step 203. However, if the answer to query step 223 is YES, the routine declares loss of synchronization in step 225, clears all soft-counters in step 217, and transitions to step 203.

Figure 4:
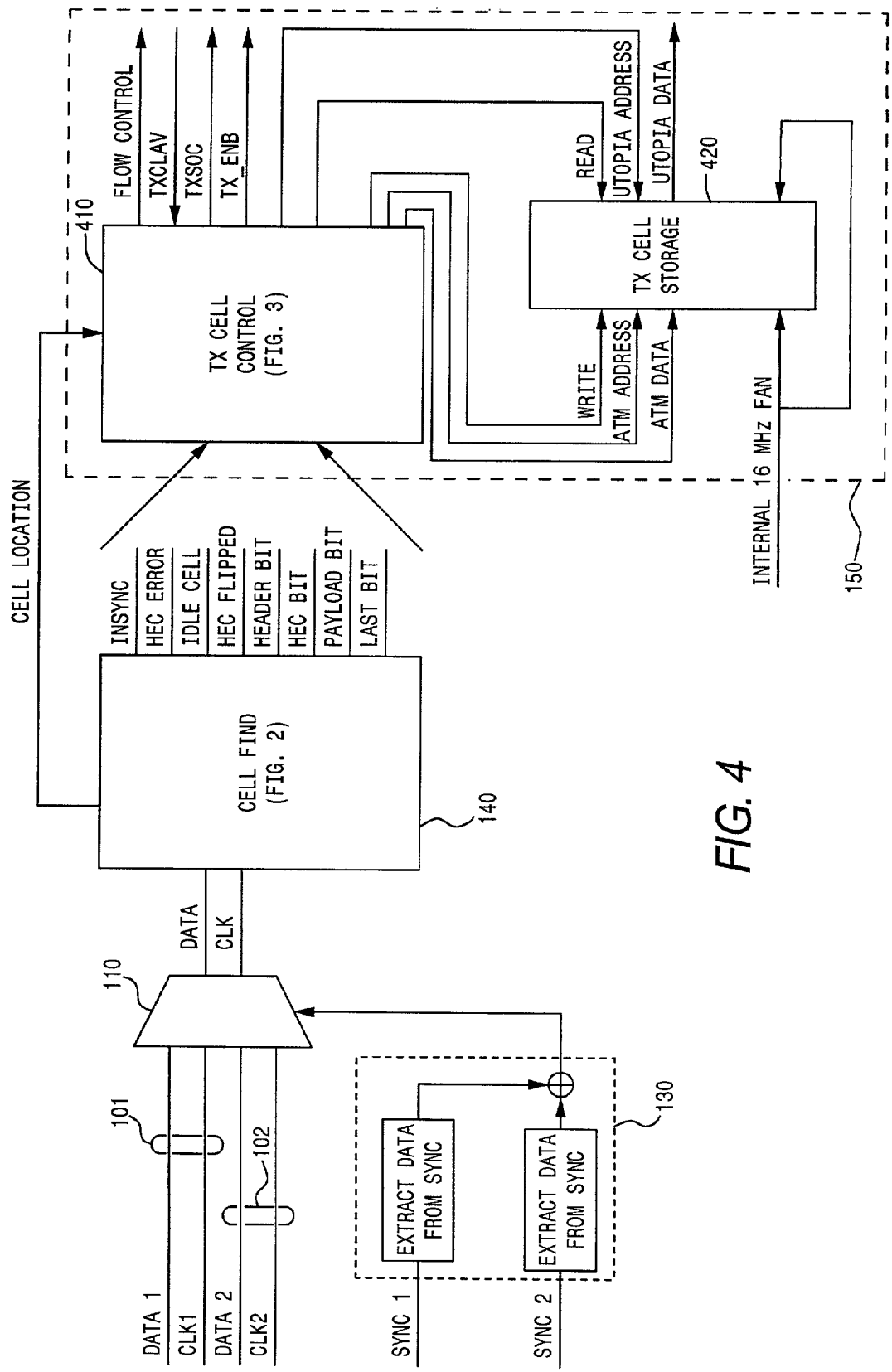
FIG. 4 is an expanded detail diagram of the transmit cell storage and control unit of the backplane interface of FIG. 1.

Attention is now directed to FIG. 3, which shows the respective steps of the transmit ATM cell control flow routine 410 of FIG. 4 for controllably generating write address pointers for loading respective bits of incoming ATM cells into a dual port transmit memory 420. Once loaded into memory 420, the cells are controllably read out onto the UTOPIA bus by a transmit path read control routine, shown in FIG. 9, to be described. Transmit memory 420 is comprised of a prescribed number of (53X8 bit) pages, each of which is capable of storing exactly one ATM cell.

For purposes of providing a non-limiting example, memory 420 may comprise a sixteen page memory (having eight upper pages and eight lower pages), each page being a 53X8 buffer having 53 slots that store respective eight-bit bytes of ATM cell data. Address codes to these memory slots are binary and increment with every bit received from the serial ATM channel. Once a complete (424 bit long) ATM cell has been written into transmit buffer, the validity of the stored cell is determined in accordance with the application of the effects of operations carried out in the cell processing routine of FIG. 2, described above, to the cell control flow routine of FIG. 3.

In particular, for each bit of a processed ATM cell, at query step 301, a determination is made as to whether the Last Bit has been asserted to a '1' at increment bit count step 203 in the routine of FIG. 2, described above. If the answer to query step 401 is YES (indicating that current bit is the last or 424th bit of the cell), the routine transitions to query step 302; otherwise, the cell is declared not valid in step 306 and the routine loops back to query step 301. In query step 302, a determination is made as to whether the In Sync Bit has been asserted to a '1' at step 216 of the routine of FIG. 2. If so, the routine transitions to query step 303; otherwise, the routine loops to step 306 and the cell is declared not valid.

In query step 303, a determination is made as to whether the HEC Error Bit has been asserted to a '1' at step 221 of the routine of FIG. 2. If not, the routine transitions to query step 304; otherwise, the routine loops to step 306 and the cell is declared not valid. In query step 304, a determination is made as to whether the HEC Flipped Bit has been asserted to a '1' at step 213 of the routine of FIG. 2. If so, the routine transitions to query step 305; otherwise, the routine loops to step 306 and the cell is declared not valid. In query step 305, a determination is made as to whether the Idle Cell Bit has been asserted to a '1' at step 206 of the routine of FIG. 2. If so, the routine loops to step 306 and the cell is declared not valid. However, if the answer to query step 305 is NO (indicating that the cell is not an Idle Cell), the cell is declared valid in step 307, and the routine transitions to a write-read offset query step 311.

Figure 5:
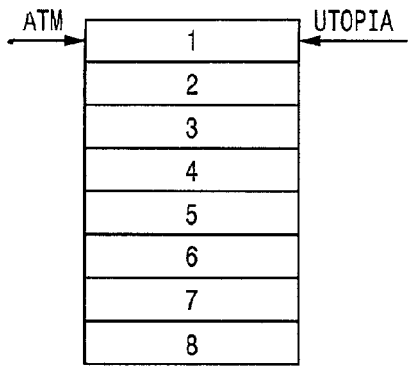
FIGS. 5, 6 and 8 are respective transmit memory address pointer diagrams associated with the operation of the transmit cell storage and control unit of the backplane interface of FIG. 1.
Figure 6:
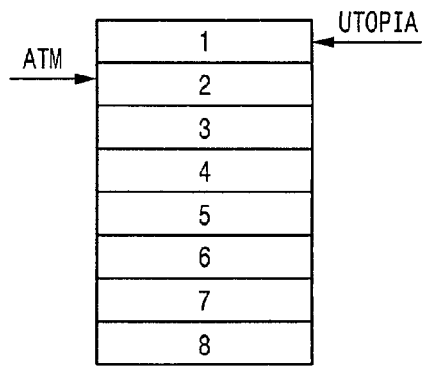

In query step 311, a determination is made as to whether the current address pointer for writing ATM cells into the transmit memory 420 is pointing to one page behind the read address pointer for the UTOPIA channel. Initially, as shown in the transmit memory address pointer diagram of FIG. 5, both the ATM write and UTOPIA read address pointers are pointing to the same memory address. Thus, at the start of the routine, the answer to query step 311 is NO. Therefore, with the first valid cell now written into the first page of memory (to which the UTOPIA read address pointer is currently pointing), it is necessary to advance the address pointer to the next page. This is carried out in step 312, which increments the ATM address count to point to the next page of the dual port memory 420, as shown in FIG. 6.

Next, in query step 313, a determination is made as to whether an ATM page counter has reached a value of half the available page space for storing and reading out ATM cells. As pointed out above, in the present example, the dual port transmit memory 420 and provides for the storage and read out of ATM cells in a ping-pong fashion, having eight upper pages (cell buffers) and eight lower pages. Query step 313 provides a steering mechanism between these two page sets. If the ATM count value is not yet maximum (eight in the present example), the answer to query step 313 is NO, and the routine transitions to step 314, wherein a WRITE enable is supplied to the set of lower cell buffers, which are then addressed to load successive ATM cells as described above. If the ATM count value is maximum (eight in the present example), the answer to query step 313 is YES, and the routine transitions to step 315, so that a WRITE enable is supplied to the upper cell buffers, which are then addressed to load successive ATM cells. The routine then loops back to query step 301 for the next ATM cell bit (the first bit of the next ATM cell).

Figure 7:
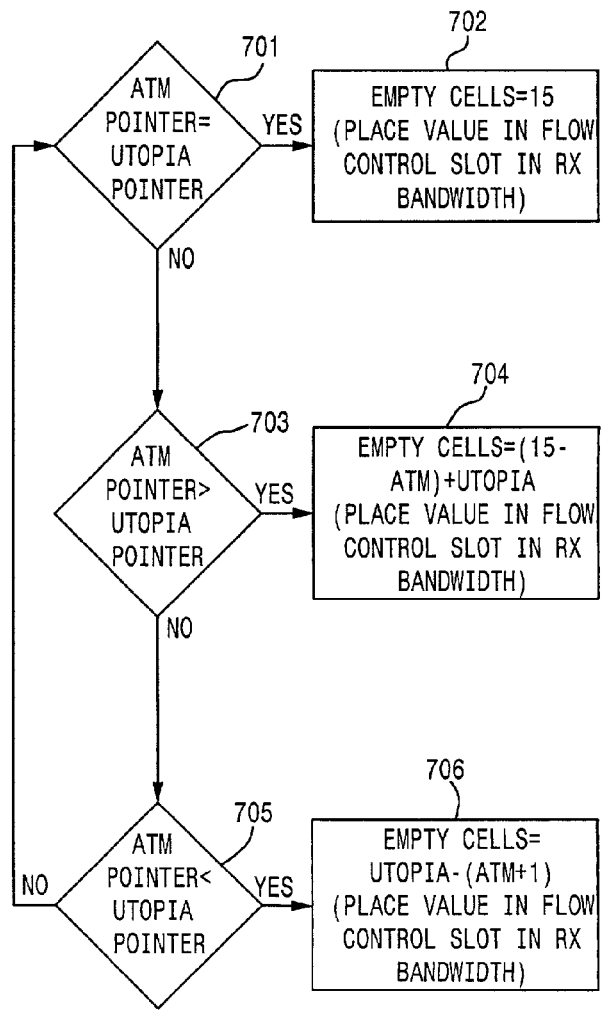
FIG. 7 is a flow chart of a data back-pressure, flow control mechanism executed by the transmit cell control mechanism of the transmit cell storage and control unit of FIG. 4.

Thus, as sequential write addresses are generated to load individual bits into successive bit storage locations of respective 53X8 ATM cell buffers, in the manner described above, the ATM cell data supplied over the ATM DATA line from the input multiplexer 110 is coupled into and stored into successive locations of the dual port RAM 420. A buffer is available for ATM cell storage, so long as it does not contain a valid ATM cell, or if the contents of the buffer have already been transferred to the UTOPIA interface. If, however, the write address pointers have been advanced to the point that there are no longer any available pages of memory for storing new valid data, currently stored (but not yet read out) ATM cells would be overwritten and therefore lost. To mitigate against this undesirable condition, known as overflow, a flow control or 'back-pressure' control mechanism, shown in the flow chart of FIG. 7, is employed.

The purpose of this flow control mechanism is to inform the input multiplexer the number of cells that the interface is able to accept, and is determined by the number of available ATM cell buffers (sixteen in the present example). If the flow control indicates that the memory buffers are unable to accept new cells, the multiplexers should send only idle cells. Although this will temporarily slow the data transport rate, it will prevent overflow and loss of data.

To this end, as shown at query step 701, a determination is made as to whether the location of the ATM write address pointer is pointing to the same page address as the UTOPIA read address pointer. If the answer to step 701 is YES (as shown in FIG. 5, for example), it is inferred that the remaining pages (fifteen in the present example) are available for ATM cell storage and, in step 702, the value Empty Cells=15 is placed in the Flow Control slot of the receive bandwidth (in the upstream direction). However, if the answer to step 701 is NO, the routine transitions to query step 703.

In query step 703, a determination is made as to whether the location of the ATM write address pointer is advanced relative to the page address of the UTOPIA read address pointer. If the answer to step 703 is YES (as shown in FIG. 6, for example), the routine transitions to step 704, wherein the value Empty Cells=((15−ATM)+UTOPIA) is placed in the Flow Control slot of the receive bandwidth. This indicates how many pages are available for ATM cell storage. However, if the answer to step 703 is NO, the routine transitions to query step 705.

Figure 8:
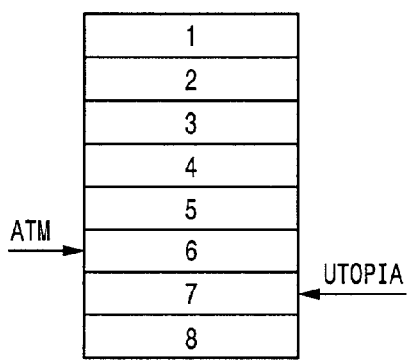

In query step 705, a determination is made as to whether the location of the ATM write address pointer is retarded relative to the page address of the UTOPIA read address pointer. If the answer to step 705 is YES (as shown in FIG. 8, for example), the routine transitions to step 706, wherein the value Empty Cells=UTOPIA−(ATM+1) is placed in the Flow Control slot of the receive bandwidth. In this case, the ATM pointer will not advance, but will continue to write over the contents of the page to which it is currently pointing, until the UTOPIA pointer has been incremented to the next page. If the answer to step 703 is NO, the routine loops back to query step 701.

Once an ATM cell has been stored in one of the pages of the dual port RAM 420, it is necessary to determine whether the UTOPIA interface will accept that cell. If the UTOPIA interface is available, a complete ATM cell will be read out of memory and transferred to the UTOPIA interface, so that the read-out buffer/page can store a new ATM cell. The UTOPIA interface will continue to transfer (read out) ATM cells from memory as long as valid cells are available, and the external device that is coupled to the UTOPIA interface is ready to accept them.

Figure 9:
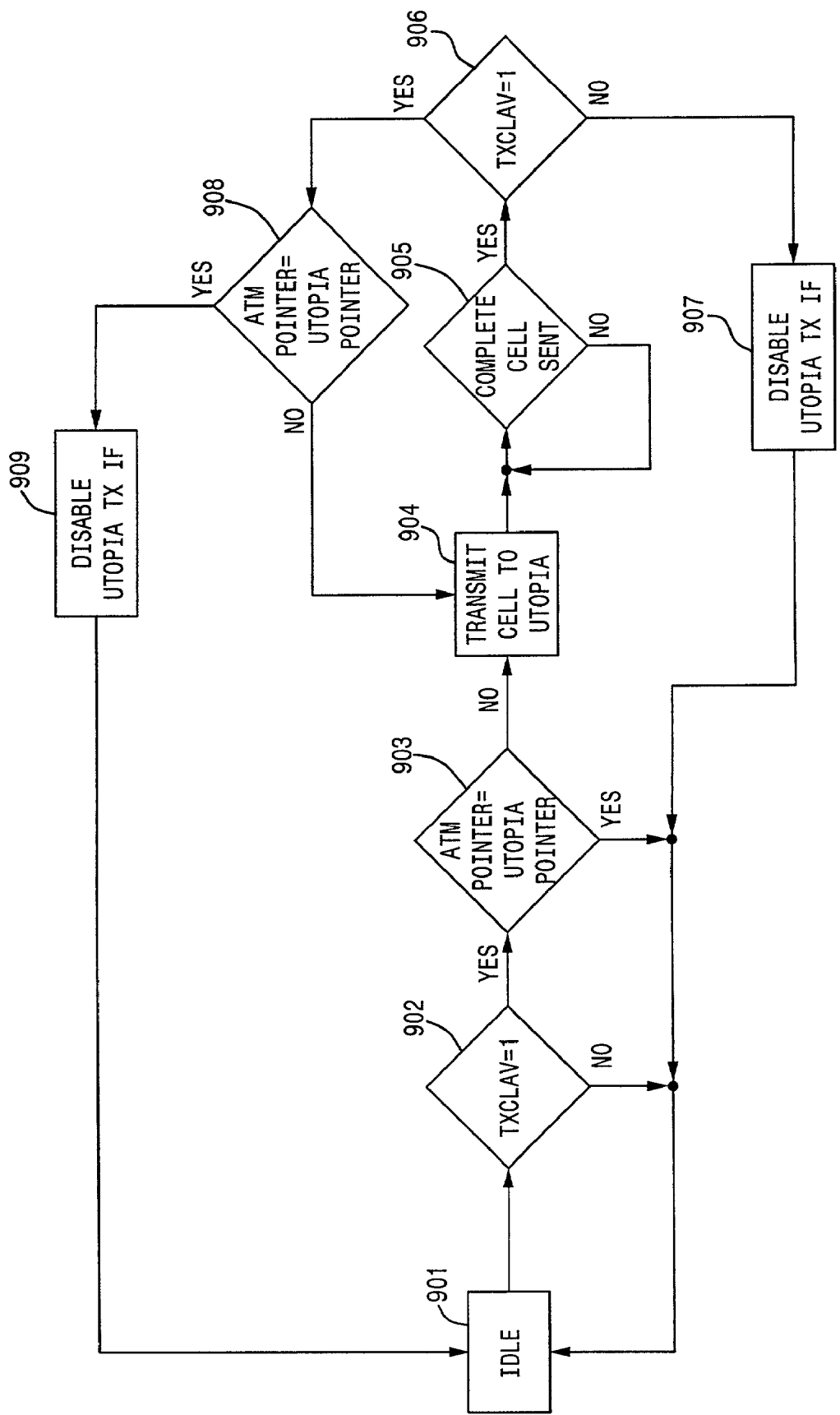
FIG. 9 is a flow chart of the transmit UTOPIA cell control routine executed by the transmit cell read control mechanism of the transmit cell storage and control unit of FIG. 4.

To this end, the transmit UTOPIA cell control routine, shown in the flow chart of FIG. 9, is executed by the transmit cell control mechanism 410 within the transmit cell storage and control unit 150. From an initial idle state 901, the routine transitions to query step 902 to determine whether a '1' is being asserted at an input port TxClav from the UTOPIA interface, indicating that the UTOPIA interface is ready to accept an ATM cell. Until the answer to query step 902 is YES, the routine loops back to the idle state 901. When the UTOPIA interface asserts a '1' on the input port TxClav, the answer to query step 902 is YES, and the routine transitions to query step 903. In query step 903, a determination is made as to whether the location of the ATM write address pointer is pointing to the same page address as the UTOPIA read address pointer. If the answer to step 903 is YES (as shown in FIG. 5, referenced above), it is concluded that no new ATM cell can be sent to the UTOPIA interface until the ATM pointer advances beyond the current page to which it points, and make the contents of that page available for read out to the UTOPIA interface. In this case, therefore, the routine loops back to idle.

However, once the ATM pointer has been incremented to the next page, the page to which it previously pointed becomes available for read-out. In this case, the answer to query step 903 is NO, and the routine transitions to step 904. In step 904, the contents of the ATM cell in the page currently pointed to by the UTOPIA pointer are read out from dual port memory 420 and coupled to the UTOPIA interface. Once the complete ATM cell in that page has been read out (the answer to the next query step is YES), the routine transitions to query step 906.

In query step 906 a determination is again made as to whether a '1' is still being asserted at input port TxClav from the UTOPIA interface, which would indicate that the UTOPIA interface is ready to accept another ATM cell. If the answer to query step 906 is NO, the routine transitions to step 907, declaring the UTOPIA transmit interface disabled, and then loops back to the idle state 901. If the answer to query step 906 is YES, the routine transitions to query step 908 which, like query step 903, determines whether the location of the ATM write address pointer is pointing to the same page address as the UTOPIA read address pointer. If the answer to step 908 is YES, it is again concluded that no new ATM cell can be sent to the UTOPIA interface until the ATM pointer advances beyond the current page to which it points, so as to make the contents of that page available for read out to the UTOPIA interface. In this case, the routine transitions to step 909, to declare the UTOPIA transmit interface disabled, and then loops back to idle. However, if the answer to step 908 is NO, the routine transitions to step 904, wherein the contents of the ATM cell in the page currently pointed to by the UTOPIA pointer are read out from dual port memory 420 and coupled to the UTOPIA interface.

In order to transfer data in the 'upstream' direction (from the UTOPIA bus to the serial TDM backplane), the backplane interface of the invention contains a receive cell storage and control unit, shown at 180 in FIG. 1, which functions in a manner complementary to the transmit cell storage and control unit 150, described above, in that it controllably stores ATM cells supplied from the UTOPIA bus, and then serializes out these cells for application to the TDM backplane.

The architecture of the receive cell storage and control unit 180 is shown in expanded detail in FIG. 10 as comprising a receive cell dual port memory 1010, which is configured to controllably store respective UTOPIA cells supplied from the UTOPIA by way of an RxData port. Like the dual port memory 420 in the transmit cell storage and control unit 150 described above, the receive cell dual port memory 1010 contains a prescribed number of (53X8 bit) pages, each of which is capable of storing one ATM cell.

For this purpose, dual port memory 1010 may comprise a sixteen page memory (having eight upper pages and eight lower pages), each page being a 53X8 buffer which stores a complete ATM cell data. Unlike the transmit (downstream) direction, each cell does not have to be framed, as it is transferred independently from the UTOPIA interface. The manner in which data cells received from the UTOPIA interface are controllably written into the receive cell buffer 1010 will be described below with reference to the flow chart of FIG. 11.

Figure 12:
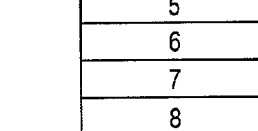

An auxiliary idle cell storage buffer 1020 serves as a store for idle cells. These two cell buffers are controlled by a receive cell control unit 1030. The manner in which cells (including both ATM data cells stored in the data cell buffer 1010 and idle cells stored in the auxiliary buffer 1020) are controllably read out for transmission in the upstream direction to the ATM backplane will be described below with reference to the flow chart of FIG. 12.

The ATM cell output of the receive cell buffer 1010 is coupled to a first input 1041 of an output multiplexer 1040, while a 'fill data' output of the idle cell buffer 1020 is coupled to a second input 1042 of output multiplexer 1040.

Output multiplexer 1040 has a third input 1043 coupled to a delay compensation unit 1050, and a fourth input coupled to a flow control unit 1060. The steering path through output multiplexer 1040 is controlled by receive cell control unit 1030.

The serial data output 1045 of the output multiplexer 1040 is coupled to a dual output channel demultiplexer (demux) 1070, first and second outputs 1071 and 1072 of which are interfaced with the back plane. Similar to the input multiplexer in the transmit path, the steering path through the output demux 1070 to one of outputs 1071 and 1072 is normally coupled to a default path, and is controllably switched to the other path based on a mux select signal (Mux Alive) from Data Extraction from the sync input 115 in response to a fault.

Figure 11:
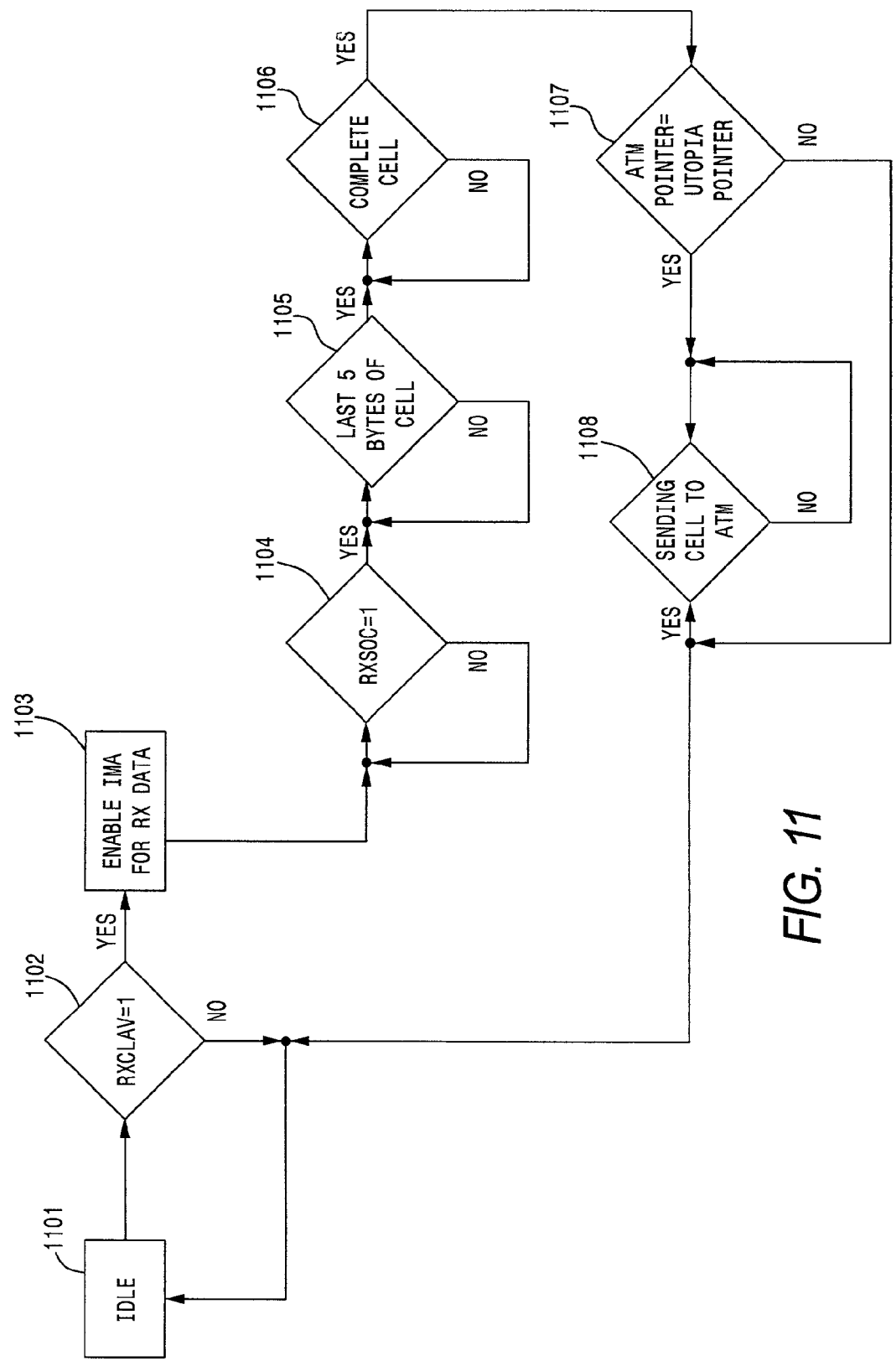
FIG. 11 is a flow chart of the UTOPIA data receive and storage routine employed by the receive cell is control unit of the backplane interface of FIG. 1.

Attention is now directed to the flow chart of FIG. 11, which shows respective steps of the UTOPIA data receive and storage routine employed by the receive cell control unit 1030 for controllably writing cells received from the UTOPIA interface into the receive cell buffer 1010. As will be described, this routine implements flow control, to prevent a cell transfer from the UTOPIA interface if no buffer is available. A buffer is considered unavailable during the time it is accessed by the ATM interface, or contains a valid cell yet to be read out on the serial TDM bus.

To this end, in an idle state 1101, the UTOPIA RxCell storage control routine is waiting for a query step 1102 to indicate that the UTOPIA interface has an ATM cell available for transfer. When the UTOPIA interface has an available ATM cell, it asserts a '1' at input port RxClav of the receive cell control unit 1030. Until the answer to query step 1102 is YES, the routine remains in the idle state 1101. In response to the UTOPIA interface asserting a '1' on the input port RxClav, the answer to query step 1102 becomes YES, and the routine transitions to step 1103, to enable the IMA and thereby inform the UTOPIA interface that it can proceed to transfer an ATM cell for storage in the RxCell memory.

When initiating a cell transfer, the UTOPIA interface asserts a '1' at a 'start of cell' port RxSoC. Therefore, in query step 1104, a determination is made as to whether RxSoC='1'. Until the answer to query step 1104 is YES, the routine remains in a wait loop. In response to the UTOPIA bus initiating a cell transfer (which is to be completed within one clock period), asserting a '1' at the RxSoC port, the routine transitions to query step 1105. In query step 1105, the routine anticipates completion of the cell transfer by looking for the last five bytes of the cell. If not, it is inferred that the UTOPIA bus will send more of the cell, and the routine waits for completion of the cell transfer.

In response to the answer to query step 1105 being YES, the routine transitions to query step 1106. Once the cell transfer has been completed (the answer to query step 1106 is YES), the UTOPIA pointer is advanced to the next RxCell page (such as shown in the receive memory address pointer diagram of FIG. 12), and the routine transitions to query step 1107. (The ATM read pointer will not advance until the UTOPIA write pointer has incremented.)

In query step 1107, the memory address of the UTOPIA write pointer is compared with that of the ATM read pointer. If the two pointers are the same, it is inferred that the RxCell memory 1010 is full (the answer to step 1107 is YES), and the routine transitions to query step 1108. If the two pointers are not the same, it is inferred that the RxCell memory 1010 has available space to store another cell from the UTOPIA interface (the answer to step 1107 is NO), and the routine transitions to back to idle.

Where the writing of a cell from the UTOPIA interface into the RxCell memory has caused the answer to step 1107 to be YES, query step 1108 looks to see if a cell is being read out from the RxCell memory for application to the ATM bus. Until this happens, the answer to query step 1108 is NO. Once a cell is read out, the answer to query step 1108 is YES, and the routine transitions to idle, to await the UTOPIA interface asserting a '1' on the input port RxClav, as described above.

Figure 13:
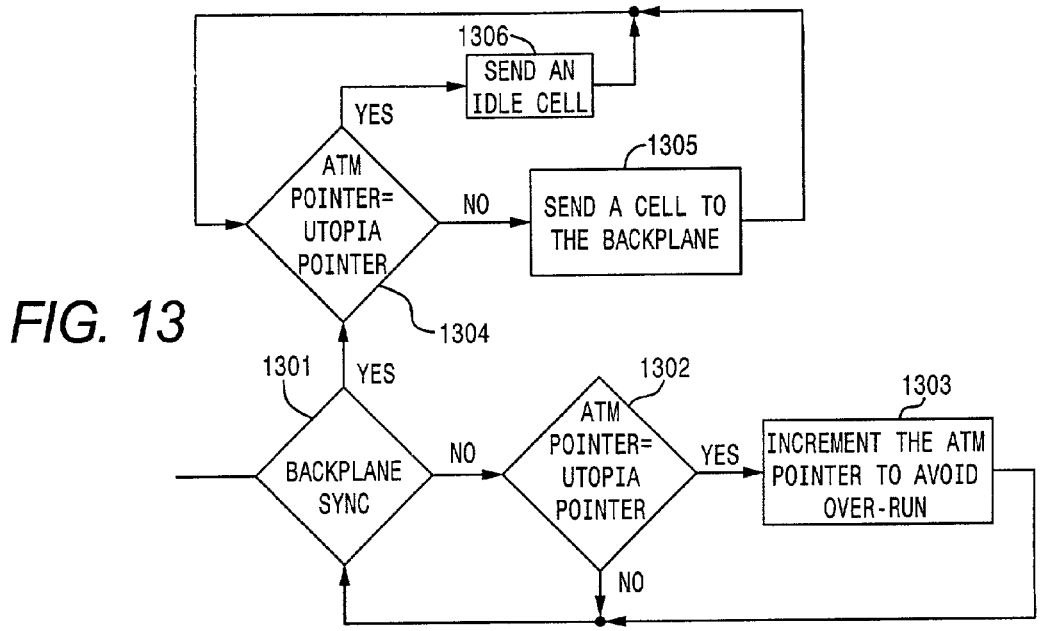
FIG. 13 is a flow chart of the ATM cell read out control routine employed by the receive cell control unit of the backplane interface of FIG. 1.

As ATM cells are stored in the pages of the dual port RxCell RAM 1010, they are controllably serially read out for transport over the ATM backplane, using the read out control routine shown in the flow chart of FIG. 13. In a first query step 1301, the RxCell read-out control routine is awaiting for a backplane sync signal (bp_sync) to be asserted by the ATM backplane. Until a backplane sync signal is asserted, the answer to query step 1301 is NO, and the routine transitions to query step 1302, which compares the memory address of the UTOPIA write pointer with that of the ATM read pointer.

Figure 14:
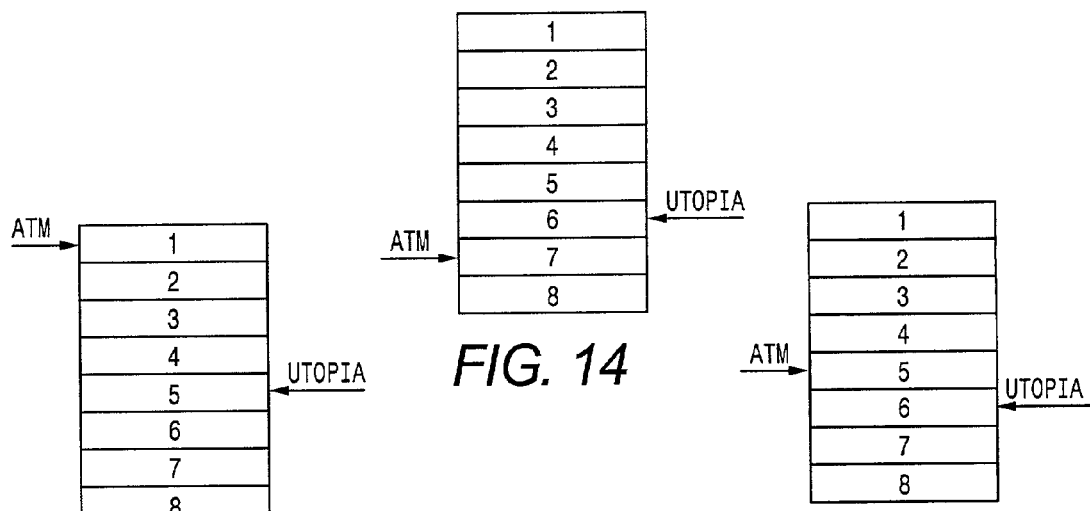
FIGS. 12, 14 and 15 are respective receive memory address pointer diagrams associated with the operation of the receive cell storage and control unit of the backplane interface of FIG. 1.

So long as the two pointers are not the same (the answer to query step 1302 is NO), the routine loops back to query step 1301 and awaits backplane sync. Whenever the two pointers are the same without backplane sync having been asserted (the answer to query step 1302 is YES), and the routine transitions to step 1303, which increments the ATM read pointer. This operation (diagrammatically illustrated in the receive memory address pointer diagram of FIG. 14) serves to prevent over-run and allow more recent data being supplied by the UTOPIA interface to write over older data. The UTOPIA pointer will not advance, so that the page of data to which it currently points will be overwritten until the ATM pointer is incremented.

Figure 15:
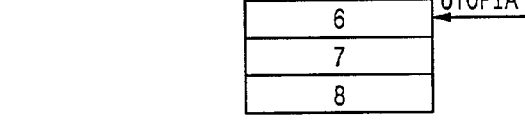

Once a backplane sync signal is asserted (the answer to query step 1301 is YES), the routine transitions to query step 1304, which compares the memory address of the UTOPIA write pointer with that of the ATM read pointer. If the two pointers are not the same (the answer to query step 1304 is NO), it is inferred that the UTOPIA write address pointer has advanced, so as to allow the page of memory pointed to by the ATM read address pointer to be sent to the backplane. The routine transitions to step 1305, wherein it enables the read port of the RxCell RAM 1010, and sets the state of the select port of the multiplexer 1040, causing an ATM cell to be sent over the ATM cell data link through multiplexer 1040 and multiplexer 1070 for application to the ATM backplane. When the ATM read pointer is one page behind the UTOPIA pointer, as shown in the receive memory address pointer diagram of FIG. 15), the ATM pointer may be advance to that page. However, the new ATM cell may not be sent to the ATM mux interface until completed.

If the answer to query step 1304 is YES, (the UTOPIA and ATM pointers are the same) however, it is inferred that the UTOPIA write address pointer has not advanced, and an idle cell is sent to the ATM backplane to keep the bus alive. In this case, the routine transitions to step 1306, to read out an idle cell from the Rx Idle RAM 1020. It also sets the state of the select port of the multiplexer 1040, to cause the idle cell to be sent over the ATM cell data link through multiplexers 1040 and 1070 for application to the ATM backplane. Both the UTOPIA write pointer and the ATM read pointer will remain stationary until new data cells are provided.

Figure 16:
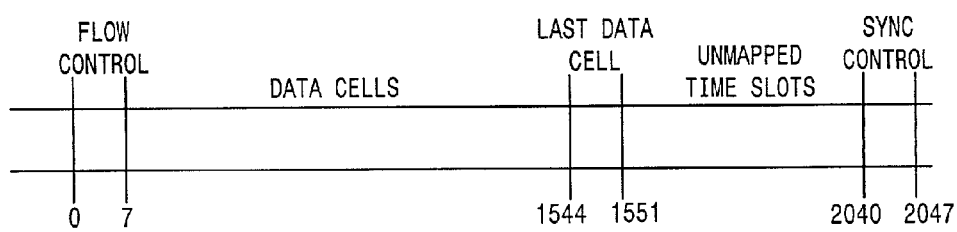
FIG. 16 is a TDM timeslot diagram for upstream-directed, UTOPIA-ATM bandwidth.

To insert flow control information into the ATM data stream the Rx cell control unit 1030 controls the steering path through multiplexer 1040 to inject flow control byte 1060 and delay compensation byte 1050 into two timeslots of the available upstream TDM bandwidth, shown in FIG. 16. The remaining timeslots are available for the transport of ATM cell data stored in the ATM cell buffers. As the bandwidth available for ATM cell transport is not an even multiple of cell size, a cell may be partially transferred. The ATM interface saves the remaining portion of the cell for transfer during the next available bandwidth data timeslots. Also, as pointed out above, where there are no ATM data cells to transfer the unfilled timeslots are filled with idle cells.

As described above, the output of the transmit cell storage and control unit 150 and input to the receive cell storage and control unit 180 are interfaced with the UTOPIA bus via a controlled UTOPIA internal loopback path 160 and a controlled IMA loopback path 170. These controlled loopback paths are individually controllable to accept data from an active interface and return it through the opposite channel, and thereby provide for testing where an external device is not present. Thus, if the serial TDM interface is active, but there is no active UTOPIA interface, downstream-directed data may be looped back to the TDM interface on the opposite channel through the UTOPIA internal loopback path 160. Conversely, if the UTOPIA interface is active, but there is no active serial TDM interface, upstream-directed data may be looped back through the IMA loopback path 170 to the opposite channel for return to the UTOPIA interface.

As will be appreciated from the foregoing description, through the use of an ATM cell boundary 'filter' and a transmit flow control mechanism, the bi-directional serial TDM backplane—UTOPIA interface of the invention readily provides for the efficient capture and storage of ATM cells from a serial communication type device, such as an Inverse Multiplexer for ATM (IMA) type device. Once stored in the transmit buffer, the individual ATM cells are controllably read out for application to a downstream UTOPIA interface. In the 'upstream' direction from the UTOPIA bus toward the serial TDM backplane, ATM cells are stored in a multi-cell receive buffer, so that they may be serialized for application to the TDM backplane. In the absence of ATM data cells to transfer, unfilled TDM timeslots are controllably filled with idle cells supplied by an idle cell buffer to maintain the ATM bus active.

While we have shown and described a preferred embodiment of the invention, it is to be understood that the same is not limited thereto but is susceptible to numerous changes and modifications as known to a person skilled in the art. We therefore do not wish to be limited to details shown and described herein, but intend to cover all such changes and modifications as are obvious to one of ordinary skill in the art.

What is claimed is:

1. A method for interfacing asynchronous transfer mode (ATM) cells between first and second communication channels comprising the steps of:
    (a) providing a first, serial data port that is adapted to be coupled to a time division multiplexed (TDM) data channel over which ATM cells are serially transported:
    (b) providing a second data port that is adapted to be coupled to a Universal Test and Operations PHY Interface for ATM (UTOPIA) channel; and
    (c) interfacing ATM cells within a downstream serial data stream supplied to said first serial data port with said second data port for application to said UTOPIA data transport channel, and interfacing ATM cells supplied to said second data port from said UTOPIA data transport channel to said first serial data port for application within an upstream serial data stream to said TDM data channel, and wherein step (c) comprises inserting flow control information, that is used to control the transport of ATM cells within said downstream serial data stream supplied to said first serial data port, into said upstream serial data stream to said TDM data channel.

2. The method according to claim 1, wherein step (c) comprises:
(c1) monitoring said downstream serial data stream to locate boundaries of valid ATM cells therein, and
(c2) controllably coupling to said second data port valid ATM cells whose boundaries have been located in step (c1).

3. The method according to claim 1, wherein step (c) comprises:
(c1) monitoring said downstream serial data stream to locate boundaries of valid ATM cells therein,
(c2) controllably storing valid ATM cells whose boundaries have been located in step (c1), and
(c3) controllably coupling to said second data port valid ATM cells that have been controllably stored in step (c2).

4. The method according to claim 3, wherein step (c2) comprises controllably writing into a transmit memory valid ATM cells whose boundaries have been located in step (c1), and wherein step (c3) comprises controllably reading out from said transmit memory valid ATM cells as stored in step (c2) and coupling read out ATM cells to said second data port.

5. The method according to claim 3, wherein step (c1) comprises monitoring said downstream serial data stream to compute HEC bytes of valid ATM cells therein, and wherein step (c2) comprises controllably storing complete ATM cells whose HEC bytes boundaries have been computed in step (c1).

6. The method according to claim 3, wherein step (c3) comprises controllably coupling to said second data port valid ATM cells, that have been controllably stored in step (c2), in accordance with a prescribed relationship between write and read address pointers to said transmit memory.

7. The method according to claim 1, wherein step (c) further includes inserting flow control information, that is used to control the transport of ATM cells within said downstream serial data stream supplied to said first serial data port, into said upstream serial data stream to said TDM data channel, in accordance with said prescribed relationship between write and read address pointers to said transmit memory, and thereby prevent currently stored ATM cells, that have not yet been read out to said second data port, from being overwritten by newly received ATM cells.

8. The method according to claim 7, wherein said flow control information inserted into timeslots of the available TDM bandwidth of the upstream ATM data stream is employed to cause the transmission of idle cells in place of ATM cells over said TDM data channel to said first, serial data port.

9. The method according to claim 3, wherein step (c3) comprises coupling to said second data port a valid ATM cell that has been stored in step (c2), in response to receiving information that said UTOPIA channel is ready to accept an ATM cell.

10. The method according to claim 1, wherein step (c) comprises:
(c1) controllably writing into a receive memory ATM cells supplied to said second data port from said UTOPIA data transport channel, and
(c2) controllably reading out from said receive memory ATM cells stored in step (c1) and coupling read out ATM cells to said first data port for application to said upstream serial data stream to said TDM data channel.

11. The method according to claim 10, wherein step (c2) comprises controllably coupling to said first data port ATM cells, that have been controllably stored in step (c1), in accordance with a prescribed relationship between write and read address pointers to said receive memory.

12. The method according to claim 10, wherein step (c2) comprises coupling to said first data port either an ATM cell stored in step (c1) or an idle cell, as necessary, to maintain said TOM data channel active.

13. The method according to claim 10, wherein step (c1) comprises controllably writing into a cell storage region of said receive memory ATM cells supplied to said second data port from said UTOPIA data transport channel, unless contents of said cell storage region are being read out onto said TDM channel, or said cell storage region contains an ATM cell that has yet to be read out onto said serial TDM channel.

14. The method according to claim 1, further including the step (d) of controllably looping ATM cells within said downstream serial data stream back to said first serial data port for application within said upstream serial data stream to said TOM data channel.

15. The method according to claim 1, further including the step (d) of controllably looping ATM cells supplied from said UTOPIA data transport channel back to said second serial data port for application to said UTOPIA data transport channel.

16. An apparatus for interfacing asynchronous transfer mode (ATM) cells between first and second communication channels comprising:
a first, serial data port that is adapted to be coupled to a time division multiplexed (TDM) data channel over which ATM cells are serially transported:
a second data port that is adapted to be coupled to a Universal Test and Operations PRY Interface for ATM (UTOPIA) channel; and
a dual port interface that is operative to interface ATM cells within a downstream serial data stream supplied to said first serial data port with said second data port for application to said UTOPIA data transport channel, and to interface ATM cells supplied to said second data port from said UTOPIA data transport channel to said first serial data port for application within an upstream serial data stream to said TDM data channel, and wherein
said dual port interface is operative to insert flow control information, that is used to control the transport of ATM cells within said downstream serial data stream supplied to said first serial data port, into said upstream serial data stream to said TDM data channel.

17. The apparatus according to claim 16, wherein said dual port interface comprises a transmit section that is operative to monitor said downstream serial data stream to locate boundaries of valid ATM cells therein, and to controllably couple to said second data port valid ATM cells whose boundaries have been located.

18. The apparatus according to claim 16, wherein said dual port interface comprises a serial data stream monitoring unit that is operative to monitor said downstream serial data stream to locate boundaries of valid ATM cells therein, a transmit memory for storing valid ATM cells whose boundaries have been located by said serial data stream monitoring unit, and a transmit read out control unit that is operative to controllably couple to said second data port valid ATM cells that have been controllably stored in said transmit memory.

19. The apparatus according to claim 18, wherein said serial data stream monitoring unit is operative to monitor said downstream serial data stream to compute HEC bytes of valid ATM cells therein, and wherein said transmit memory is operative to store complete ATM cells whose HEC bytes boundaries have been computed by said serial data stream monitoring unit.

20. The apparatus according to claim 16, wherein said dual port interface is operative to insert flow control information, that is used to control the transport of ATM cells within said downstream serial data stream supplied to said first serial data port, into said upstream serial data stream to said TDM data channel, in accordance with said prescribed relationship between write and read address pointers to said transmit memory, and thereby prevent currently stored ATM cells, that have not yet been read out to said second data port, from being overwritten by newly received ATM cells.

21. The apparatus according to claim 20, wherein said flow control information inserted into timeslots of the available TDM bandwidth of the upstream ATM data stream is employed to cause the transmission of idle cells in place of ATM cells over said TDM data channel to said first, serial data port.

22. The apparatus according to claim 16, wherein said dual port interface includes a receive memory that stores ATM cells supplied to said second data port from said UTOPIA data transport channel, and a receive memory control unit that is operative to controllably read out from said receive memory ATM cells stored therein and to couple read out ATM cells to said first data port for application to said upstream serial data stream to said TDM data channel.

23. The apparatus according to claim 22, wherein said receive memory control unit is operative to controllably couple to said first data port ATM cells stored in said receive memory, in accordance with a prescribed relationship between write and read address pointers to said receive memory.

24. The apparatus according to claim 23, wherein said receive memory control unit is operative to couple to said first data port either an ATM cell stored in said receive memory or an idle cell stored in auxiliary memory, as necessary, to maintain said TDM data channel active.

25. The apparatus according to claim 22, wherein said receive memory control unit is operative to controllably write into a cell storage region of said receive memory ATM cells supplied to said second data port from said UTOPIA data transport channel, unless contents of said cell storage region are being read out onto said TDM channel, or said cell storage region contains an ATM cell that has yet to be read out onto said serial TOM channel.

26. The apparatus according to claim 16, further including a loopback path that is operative to controllably loop ATM cells within said downstream serial data stream back to said first serial data port for application within said upstream serial data stream to said TDM data channel.

27. The apparatus according to claim 16, further including a loopback path that is operative to controllably loop ATM cells supplied from said UTOPIA data transport channel back to said second serial data port for application to said UTOPIA data transport channel.

* * * * *